United States Patent [19]

Delabastita et al.

[11] Patent Number: 5,766,807
[45] Date of Patent: Jun. 16, 1998

[54] HALFTONE SCREEN AND METHODS FOR MAKING AND USING THE SAME

[75] Inventors: Paul Delabastita, Antwerp; Katrien Daels, Lier; Johan Van Hunsel, Hasselt; Jan Van Cauwenberge, Zottegem, all of Belgium

[73] Assignee: Agfa-Gevaert, N.V., Mortsel, Belgium

[21] Appl. No.: 637,110

[22] Filed: Apr. 24, 1996

[30] Foreign Application Priority Data

Apr. 28, 1995 [EP] European Pat. Off. .......... 95201096

[51] Int. Cl.⁶ .................... G03F 5/08; G03F 7/06
[52] U.S. Cl. .................. 430/6; 430/270.1; 430/300; 430/396; 359/893

[58] Field of Search .................. 430/6, 300, 396, 430/270.1; 359/893

[56] References Cited

U.S. PATENT DOCUMENTS

5,283,140  2/1994  Netz et al. .................. 430/6

*Primary Examiner*—Christopher G. Young
*Attorney, Agent, or Firm*—Julie A. Krolikowski; John A. Merecki

[57] ABSTRACT

In order to improve the printability of a periodic halftone screen, the amount of growth of the halftone dots in a halftone screen is modulated as a function of tone in a tone selective way that is different for at least two halftone dots.

21 Claims, 5 Drawing Sheets

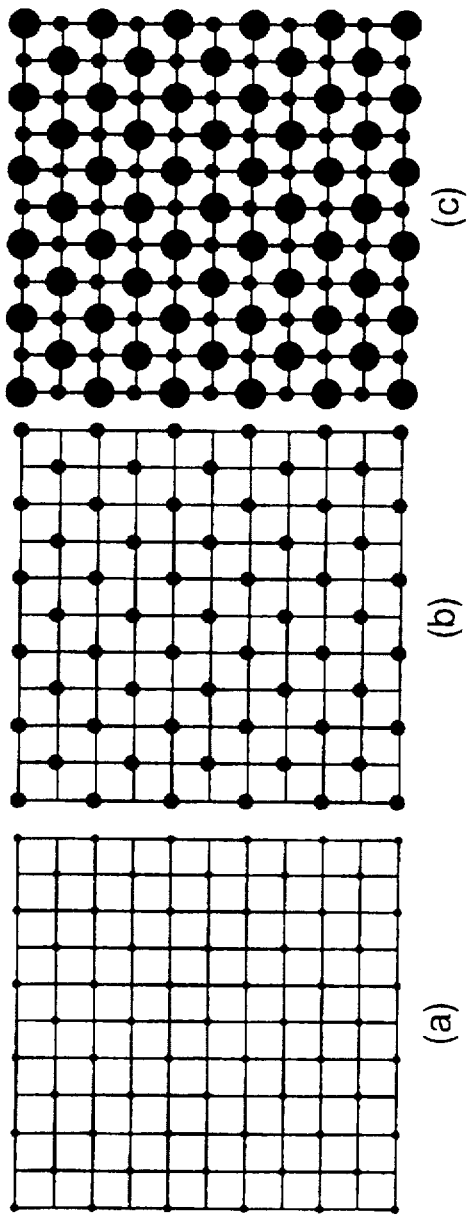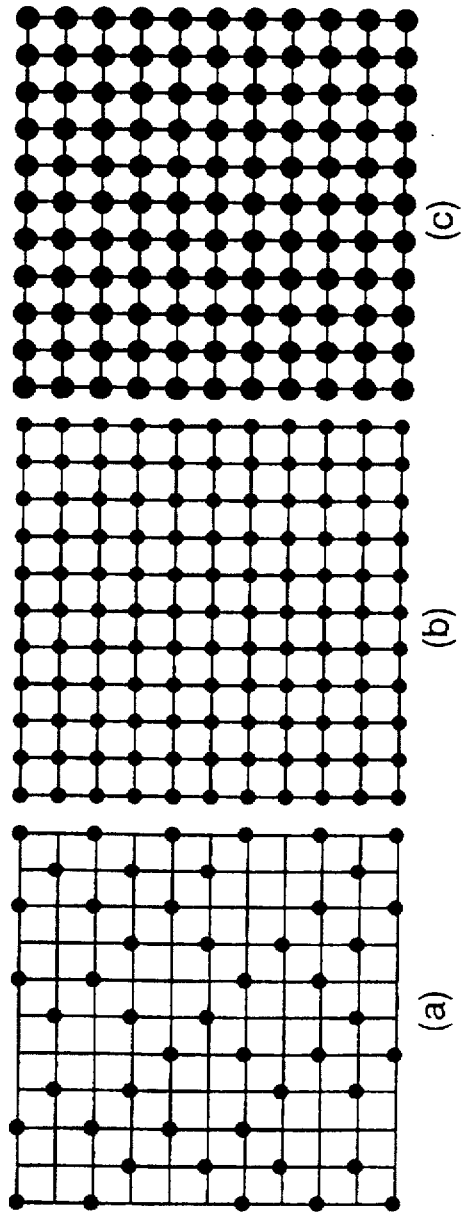

| 72 | 108 | 221 | 203 | 132 | 95 | 179 | 143 | 53 | 54 | 120 | 159 |
|---|---|---|---|---|---|---|---|---|---|---|---|
| 177 | 106 | 239 | 186 | 28 | 26 | 77 | 147 | 51 | 56 | 195 | 212 |
| 141 | 67 | 70 | 140 | 22 | 24 | 113 | 235 | 200 | 129 | 248 | 230 |
| 88 | 65 | 68 | 193 | 211 | 164 | 182 | 253 | 218 | 35 | 33 | 97 |
| 234 | 163 | 124 | 246 | 228 | 157 | 10 | 92 | 127 | 29 | 31 | 115 |
| 251 | 216 | 81 | 99 | 175 | 13 | 8 | 12 | 170 | 152 | 79 | 198 |
| 180 | 145 | 38 | 40 | 116 | 156 | 74 | 109 | 223 | 205 | 134 | 93 |
| 76 | 148 | 37 | 42 | 191 | 209 | 173 | 104 | 241 | 188 | 21 | 19 |
| 111 | 237 | 202 | 131 | 244 | 227 | 138 | 60 | 63 | 136 | 15 | 17 |
| 184 | 255 | 219 | 49 | 47 | 100 | 86 | 58 | 61 | 189 | 207 | 166 |
| 3 | 90 | 125 | 44 | 45 | 118 | 232 | 161 | 122 | 243 | 225 | 154 |
| 1 | 5 | 168 | 150 | 83 | 196 | 250 | 214 | 84 | 102 | 172 | 6 |

Fig. 7

HALFTONE SCREEN AND METHODS FOR MAKING AND USING THE SAME

FIELD OF THE INVENTION

The present invention relates to devices and methods for the reproduction of images, color or monochrome, by means of halftoning techniques.

The range over which the discontinuity occurs is hence three times smaller in this case, and the corresponding tone jump will be less disturbing. The use of a 65 lpi screen, however, deteriorates the spatial resolution of the reproduced image and increases the visibility of screening artifacts such as the rosette structure.

TABLE I

| lpi | 100 | 110 | 120 | 133 | 150 | 175 | 200 | 250 | 300 | 350 | 400 | 500 |
|---|---|---|---|---|---|---|---|---|---|---|---|---|
| 1% | 29 | 26 | 24 | 22 | 19 | 16 | 14 | 11 | 10 | 8 | 7 | 6 |
| 2% | 41 | 37 | 34 | 30 | 27 | 23 | 20 | 16 | 14 | 12 | 10 | 8 |
| 3% | 50 | 45 | 41 | 37 | 33 | 28 | 25 | 20 | 17 | 14 | 12 | 10 |
| 4% | 57 | 52 | 48 | 43 | 38 | 33 | 29 | 23 | 19 | 16 | 14 | 11 |
| 5% | 64 | 58 | 53 | 48 | 43 | 37 | 32 | 26 | 21 | 18 | 16 | 13 |
| 6% | 70 | 64 | 59 | 53 | 47 | 40 | 35 | 28 | 23 | 20 | 18 | 14 |
| 7% | 76 | 69 | 63 | 57 | 51 | 43 | 38 | 30 | 25 | 22 | 19 | 15 |
| 8% | 81 | 74 | 68 | 61 | 54 | 46 | 41 | 32 | 27 | 23 | 20 | 16 |
| 9% | 86 | 78 | 72 | 65 | 57 | 49 | 43 | 34 | 29 | 25 | 21 | 17 |
| 10% | 91 | 82 | 76 | 68 | 60 | 52 | 45 | 36 | 30 | 26 | 23 | 18 |
| 11% | 95 | 86 | 79 | 71 | 63 | 54 | 48 | 38 | 32 | 27 | 24 | 19 |
| 12% | 99 | 90 | 83 | 75 | 66 | 57 | 50 | 40 | 33 | 28 | 25 | 20 |
| 13% | 103 | 94 | 86 | 78 | 69 | 59 | 52 | 41 | 34 | 30 | 26 | 21 |
| 14% | 107 | 97 | 89 | 81 | 71 | 61 | 54 | 43 | 36 | 31 | 27 | 21 |
| 15% | 111 | 101 | 93 | 83 | 74 | 63 | 56 | 44 | 37 | 32 | 28 | 22 |
| 16% | 115 | 104 | 96 | 86 | 76 | 66 | 57 | 46 | 38 | 33 | 29 | 23 |
| 17% | 118 | 107 | 98 | 89 | 79 | 68 | 59 | 47 | 39 | 34 | 30 | 24 |
| 18% | 122 | 111 | 101 | 91 | 81 | 69 | 61 | 49 | 41 | 35 | 30 | 24 |
| 19% | 125 | 114 | 104 | 94 | 83 | 71 | 62 | 50 | 42 | 36 | 31 | 25 |
| 20% | 128 | 117 | 107 | 96 | 85 | 73 | 64 | 51 | 43 | 37 | 32 | 26 |
| 21% | 131 | 119 | 109 | 99 | 88 | 75 | 66 | 53 | 44 | 38 | 33 | 26 |
| 22% | 134 | 122 | 112 | 101 | 90 | 77 | 67 | 54 | 45 | 38 | 34 | 27 |
| 23% | 137 | 125 | 115 | 103 | 92 | 79 | 69 | 55 | 46 | 39 | 34 | 27 |
| 24% | 140 | 128 | 117 | 106 | 94 | 80 | 70 | 56 | 47 | 40 | 35 | 28 |
| 25% | 143 | 130 | 119 | 108 | 96 | 82 | 72 | 57 | 48 | 41 | 36 | 29 |

BACKGROUND OF THE INVENTION

The halftone dots in periodic halftoning are laid out on a fixed grid of a given frequency and angle. Tone is modulated by changing the size of the halftone dots. Particular problems arise in these processes where the reproduction characteristics of a halftone dot are size dependent.

Examples of such processes are the flexographic, the offset and the xerographic printing processes.

In flexographic printing, the size of the smallest halftone dot on film that still reproduces consistently on press can be as small as 40 micron. Below this size, halftone dots tend to print unevenly or not at all. Table I is a look up table, indicating the halftone dot diameter (expressed in micron) of round dots in periodic halftones as a function of screen frequency (in lpi) at different dot percentages. Table I shows that, if a halftone screen is used with a line ruling of 120 lpi, this 40 micron halftone dot on film corresponds to a coverage on film of 3%. From this follows that in combination with this screen, no consistent reproduction is possible in the range from 0 to 3%. In images, this effect shows up as a discontinuity or as posterization of the tone scale where the separated color "sets in". The high dot gain that is introduced during the plate making and printing in flexography only enhances the visibility of the problem.

The situation can be improved if a screen is used with a lower frequency. For example, by applying a 65 lpi screen instead of a 120 lpi screen, a stable dot with a size of 40 micron corresponds with a coverage on film of less than 1%.

There is hence a trade off to be made in flexography between he requirements on the range of tones that can be consistently reproduced and the spatial resolution of the image.

Despite its higher resolution, the offset printing process exhibits the same fundamental problem: depending on the quality f the paper and the specifics of the printing process, the maximum frequency of the halftone screen, and hence the spatial resolution, is limited by the demand of a consistent halftone dot reproduction across the tone scale. Few offset processes are capable to render images with halftone frequencies higher than 200 lpi without jeopardizing the smoothness of the highlight tone rendition.

A similar situation occurs in electrophotographic printing: a minimum dot size is necessary in order to obtain stable rendering of the halftone dots.

A solution has been proposed for the above problems by using frequency modulation (FM) halftoning techniques. The tone modulation in these techniques is obtained by varying the average distance between fixed sized halftone dots. By selecting a size for the halftone dot that is large enough for consistent reproduction, the above problems are avoided. FM screening however, has its own drawbacks. Especially in the midtones, the fixed sized halftone dots exhibit a larger total circumference than the halftone dots in a periodic screen and are therefore more sensitive to variations in size during the various stages of the reproduction process. In addition are most FM screens prone to "graininess", which is particularly objectionable in smooth tone transitions and flat tints. These drawbacks explain why FM screening does not provide a viable solution for all applications.

Yet another solution is known under the name of the "double dot" technique, also known as "split dot" technique or "Respi screens". According to this technique, the extremes of the tone scale (highlights and/or shadows) are rendered with halftone dots that are laid out on a grid with the same angle but half the frequency of the halftones in the rest of the tone scale. FIG. 1 shows an example of three different tone levels ((a), (b) and (c)) rendered with the "double dot" technique, known from the prior art. At a tone level somewhere between the values (b) and (c), the number of halftone dots is doubled. Since the rendering with halftone dots at half the frequency enables to render the same tone value with halftone dots that have a 1.41 times larger diameter, this technique improves the reproduction characteristics of the halftone screen. A disadvantage of the double dot technique is that below a certain dot percentage the same fundamental problem occurs as with the conventional screens, more specifically that below a certain diameter, corresponding to a certain tone value, all the halftone dots in the halftone will tend to disappear at the same time during the reproduction, creating an undesirable jump in the tone curve. It is possible, for example, that the tone level (b) in FIG. 1 can still be consistently reproduced, but that the tone level (a) can not be consistently reproduced any more, because the halftone dots are too small. This means that, somewhere in between the tone values (a) and (b), a discontinuity in the tone curve will occur. Once again, the problem can be solved by selecting a screen that has a lower frequency, but this is, as mentioned already, at the cost of the visibility of artifacts and a reduction of the spatial detail rendering. Related but not different methods were disclosed in U.S. Pat. No. 3,197,558; U.S. Pat. No. 5,068,165; RCA Review, Vol. 31, no. 3, p. 517–533; U.S. Pat. No. 4,501,811; U.S. Pat. No. 4,736,254 and U.S. Pat. No. 4,752,822.

OBJECTS OF THE INVENTION

From the previous explanation follows that a need exists for a halftoning system that provides both consistent reproduction of the halftone dots across the full tone scale and good spatial resolution.

It is a first object of the invention to improve the reproduction characteristics of periodic halftones without sacrificing spatial resolution.

It is a second object of the invention to improve the reproduction characteristics of halftones without increasing the sensitivity to variations in halftone dot size during the various stages of the reproduction.

It is a third object of the invention to improve the reproduction characteristics of a halftoning system without introducing graininess.

It is a fourth object of the invention to improve the periodical halftone screens for flexographic printing, offset printing and xerographic printing.

It is a specific object of the invention to improve the rendering of the highlights in periodical halftoning.

Further objects and advantages of the invention will become apparent from the description hereinafter.

SUMMARY OF THE INVENTION

The above mentioned objects are realised by the specific features according to the independent claims (1, 7, 14, 18). Preferred embodiments of the invention are disclosed in the dependent claims.

It was found that an improvement of the tone rendering in the highlights of periodic halftones is obtained by switching below a certain dot percentage from dot size modulation to a form of dot frequency modulation: below this dot percentage, tone is modulated not by altering the size of the halftone dots, but also, and in a continuous way their number. The dot size at which this transition from dot size to dot frequency modulation occurs, is set at a level that can be consistently reproduced. This quality requirement means that no perceptual or objectionable discontinuities in tone reproduction are noticeable. By such discontinuities is understood variations in density which are dependent on process steps, printing endurance or local differences within one reproduction. These density variations may be expressed as a psychometric color difference $\Delta E$ as defined by the CIE committee. The quality requirement may be put at a level that $\Delta E$ must not exceed 1. This requirement may be weakened or tightened to other values for $\Delta E$, depending on the application.

The method is different from the existing periodical halftoning techniques, since not only the size but also the number of halftone dots is modulated as a function of tone.

The method is different from the double dot technique since, at least over a certain part of the tone scale, the number of halftone dots is modulated in a continuous—or more precisely, a finer quantized—fashion as a function of tone.

The method is also different from the existing FM screening techniques, since the number of halftone dots does not change over at least one part of the tone scale, and since the halftone dots are still laid out on a fixed grid that is characterized by an angle and a frequency that is lower than the frequency of the grid on which the halftone dot is rendered.

A printing plate according to this invention comprises ink accepting halftone dots on an ink repellent background. By applying ink to such a printing plate, mounted on a press, this ink may be transferred to a paper or other image carrier for displaying a reproduction of the image. The ink may have different colors. Usual process colors are cyan, magenta, yellow and black. Application of ink in an imagewise fashion to the image carrier, causes the image carrier to have regions with different optical densities. These optical densities may be measured by a densitometer or color densitometer. The optical densities meant here are spatially integrated optical densities, as opposed to micro densities. A densitometer suited for measuring this type of densities typically illuminates a region larger than one millimetre by one millimetre, and measures the intensity of the reflected or transmitted light, in order to generate a density value for the illuminated region. A region with low optical density is a region, comprising at least five grid points, which has an almost constant integrated optical density. The feature that the number of halftone dots is in accordance with said low density, means that the number of halftone dots within regions having the same area but a different corresponding density, may be different and will be different if the density difference is large. In a preferred embodiment, the relation between the density and the number of halftone dots of a specific region is never decreasing. This means that the number of halftone dots preferentially does not decrease if the density increases. Preferentially, as a function of increasing density within a low density region, the area of the smallest halftone dot(s) within that region increases, and once a fixed dot area is reached, a new halftone dot is started on a grid point, having now the smallest area. This variation in number of halftone dots is necessary to compensate for the area of most of the halftone dots, which is preferentially fixed within low density regions. This fixed dot area is preferentially selected such that these halftone dots can be consistently reproduced. The majority of halftone dots must have an area substantially equal to a fixed dot area. By a majority is meant 66% or more. A low density region, according to the current invention, containing nine halftone dots, may have at most three smaller sized halftone dots. The requirement that this majority has an area substantially equal to the fixed dot area means that these halftone dots may have slightly varying dot areas, e.g. with a variation of 25%, or, where in electronic screening the halftone dots are built up of several microdots, a variation of one microdot more or less than a fixed dot area, which may be equivalent to the number of microdots within the halftone dot. By these technical features, the advantageous effect is achieved that the tone rendering of reproductions is more predictable as from the start of the printing process and the endurance of a printing plate is substantially increased, without loss of quality in the output image.

In a more preferred embodiment, substantially every grid point, within a region corresponding with a high density, is occupied by one halftone dot. This means that 90% or more of the grid points corresponding to an autotypical raster are occupied by a halftone dot in such high density region. In a region according to the higher density, an amplitude modulation screening technique is thus preferentially used. Moreover, preferentially the area of substantially each halftone dot within such a region, is not smaller than the fixed dot area as discussed above. This means that 90% or more of the halftone dots in such a region corresponding with a high density have an area equal to or larger than the fixed dot area, which is preferentially the dot area which may be reproduced consistently.

The advantageous effects may also be obtained by a photomechanical screen that is devised such that it generates the required halftone dots. In the photomechanical production of a screened image, a photosensitive medium is illuminated by the image to be reproduced, through a photomechanical screen. Usually, the density distribution on such a photomechanical screen is with regular "mountains" and "valleys". If the density distribution is chosen such that the screen comprises a plurality of spotlike zones, arranged on grid points of a periodic grid, defined by a screen angle and a screen ruling, and wherein each spotlike zone has a plurality of different optical densities within a narrow density range, wherein that density range is disjunctive from the density range of at least two closest other spotlike zones, then the effect will be that, if a continuous tone image is screened by such a screen, the majority of the halftone dots will preferentially have an area not smaller than a minimum area. Because there is an analogy between a photomechanical screen and a threshold matrix, i.e. that a photomechanical screen may be seen as a continuous tone image generated by converting the threshold values in density levels on a support or that a threshold matrix may be seen as the electronically scanned output of a photomechanical screen, a photomechanical screen and a threshold matrix are equivalent. Optical densities on a photomechanical screen are equivalent to threshold values, and a density range is equivalent to a range of threshold values. Preferentially, these spotlike zones are surrounded by zones having an optical density that is more distributed over the different spotlike zones. The combination of a screen with a continuous tone image may happen as described above in a photomechanical process. This combination may be done electronically, in an apparatus as described in conjunction with FIG. 8 below.

A continuous tone image belongs to that class of imagery, containing multiple grey levels with no perceptible quantisation to them. Halftone pictorial is composed ideally of only two grey levels, e.g. black and white. Grey, black and white may be substituted by any other process color in color printing. In the method according to the current invention, also multilevel halftoned images may be produced, by which is meant that this pictorial is composed of more than two grey levels, but that usually different grey levels have a perceptible quantisation.

A threshold matrix is said to be suitable for periodically tiling a plane, meaning that the threshold matrix may be repeated horizontally and vertically, or in any other direction, such that adjacent threshold matrices fit to each other. A threshold matrix may be square or rectangular, but may also have a diamond shape, an L shape or whatever shape, which is suitable to tile a plane. Specific threshold matrices and tiling methods may be found in U.S. Pat. No. 5,155,599 and EP 0 427 380 A2.

A halftone dot environment is a region around a halftone dot center, which may have any shape: circular, elliptical, square, rectangular, etc. An important restriction which is put on such a halftone dot environment is that is contains no more than one halftone dot center. Halftone dot environments may be slightly overlapping each other. As such, some centers of threshold matrix elements may belong to two different halftone dot environments.

DETAILED DESCRIPTION OF THE INVENTION

The invention is described hereinafter by way of examples with reference to the accompanying figures wherein:

FIG. 1 gives an example of three tone levels rendered with the "double dot" technique, known from the prior art.

FIG. 2 shows how different tone levels (a), (b) and (c) are rendered using a method according to the current invention. The number of halftone dots per unit area is progressively increased between tone levels (a) and (b).

Figure 4:
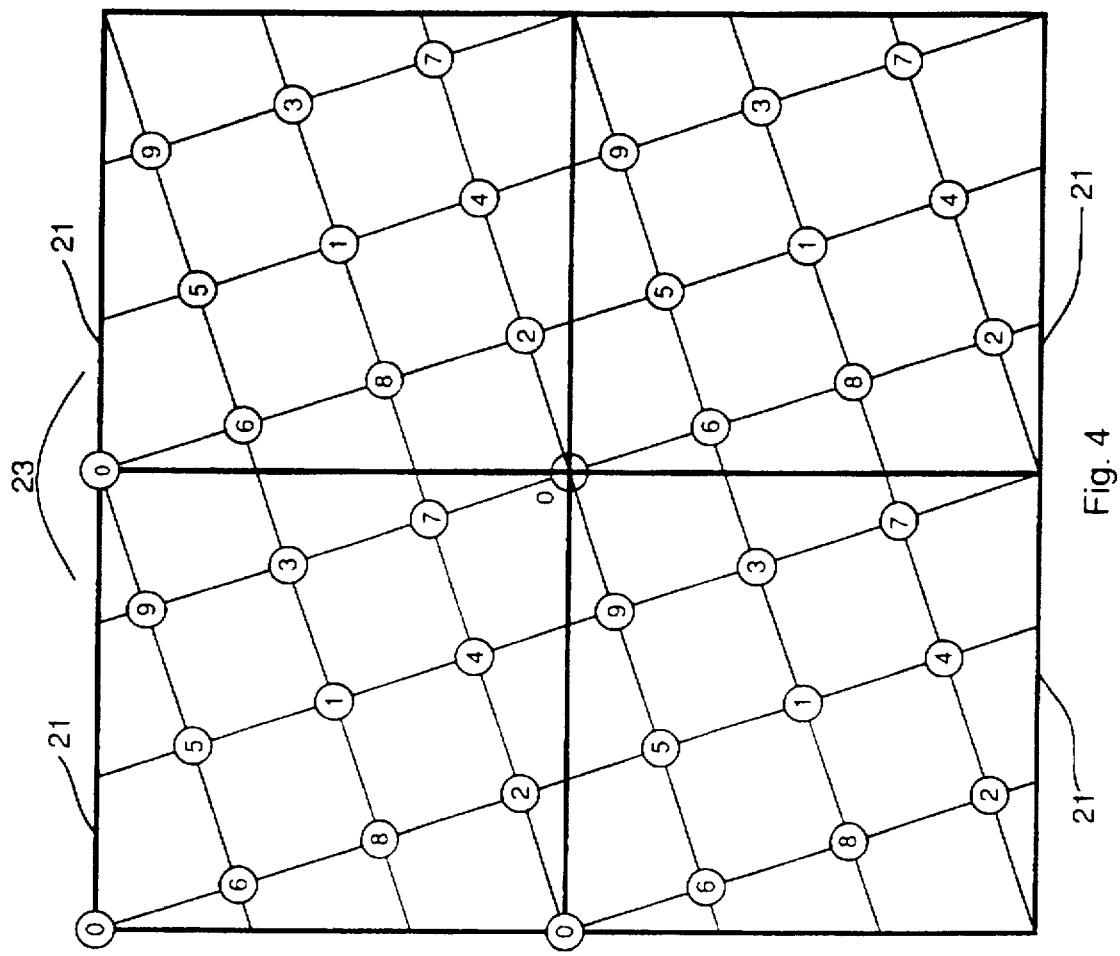
Figure 3:
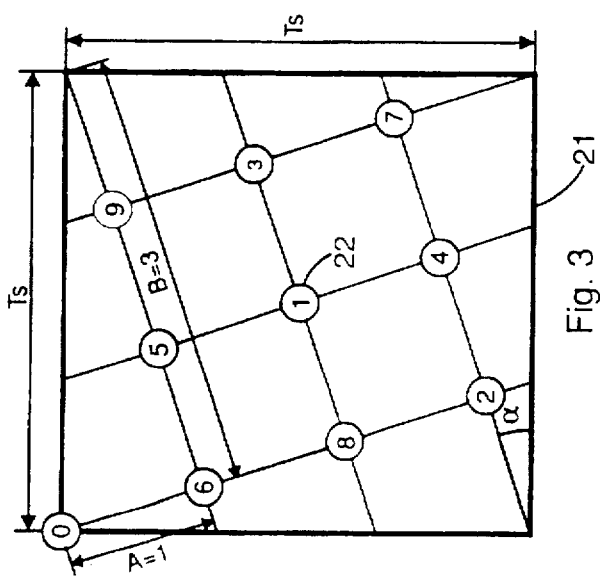
FIG. 3 shows a rational tangent supercell, having ten halftone dots.

FIG. 4 demonstrates how a complete and contiguous halftone screen may be obtained by replicating the rational tangent supercell according to FIG. 3 horizontally and vertically.

Figures 5, 6:
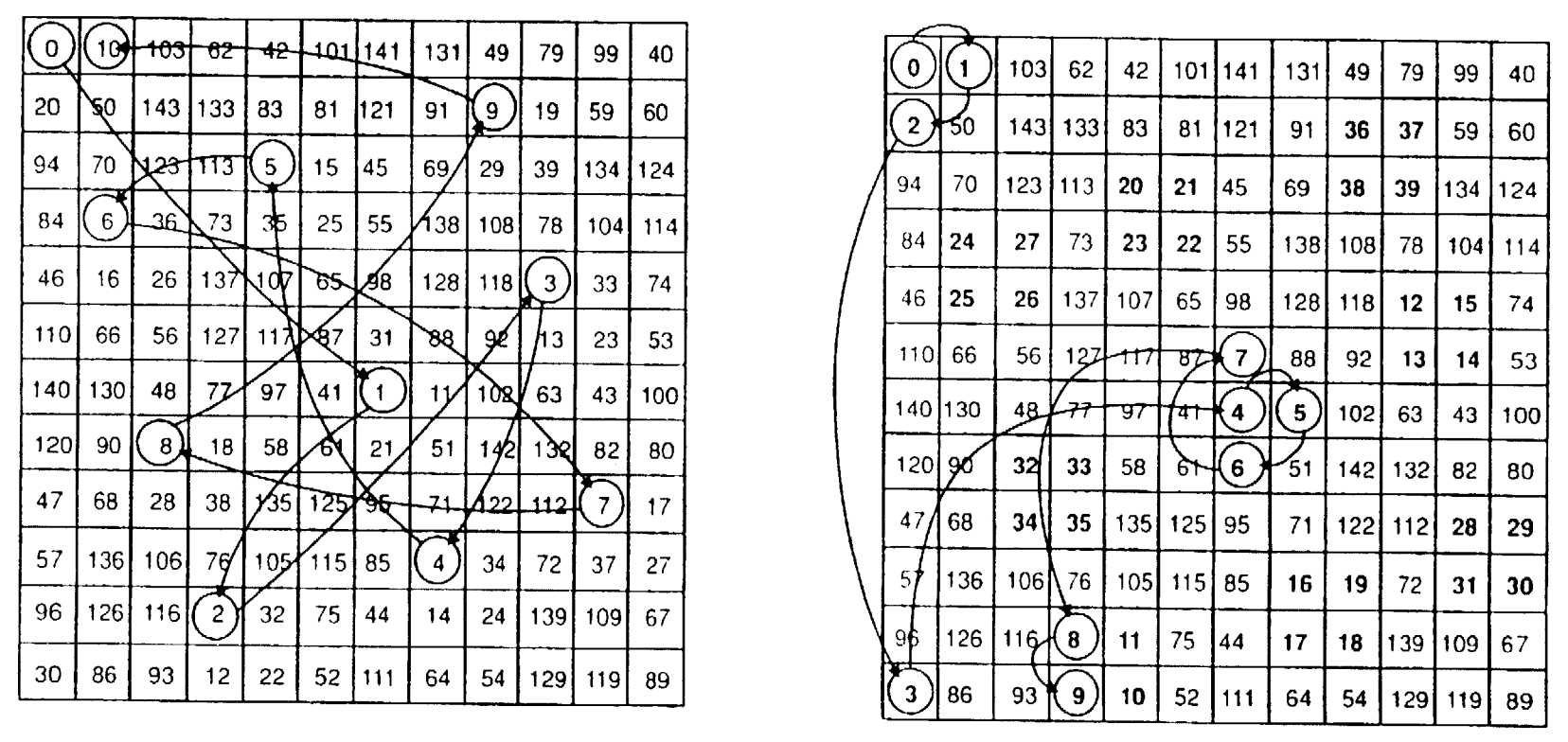

FIG. 5 shows the generation of a threshold matrix for a supercell, where an algorithm according to the present invention was applied with "maxsizecounter"=1.

FIG. 6 shows the generation of a threshold matrix for a supercell, where an algorithm according to the present invention was applied with "maxsizecounter"=4.

FIG. 7 shows a threshold matrix obtained from the matrix FIG. 6 by rescaling the values to a range from 1 to 255.

Figure 8:
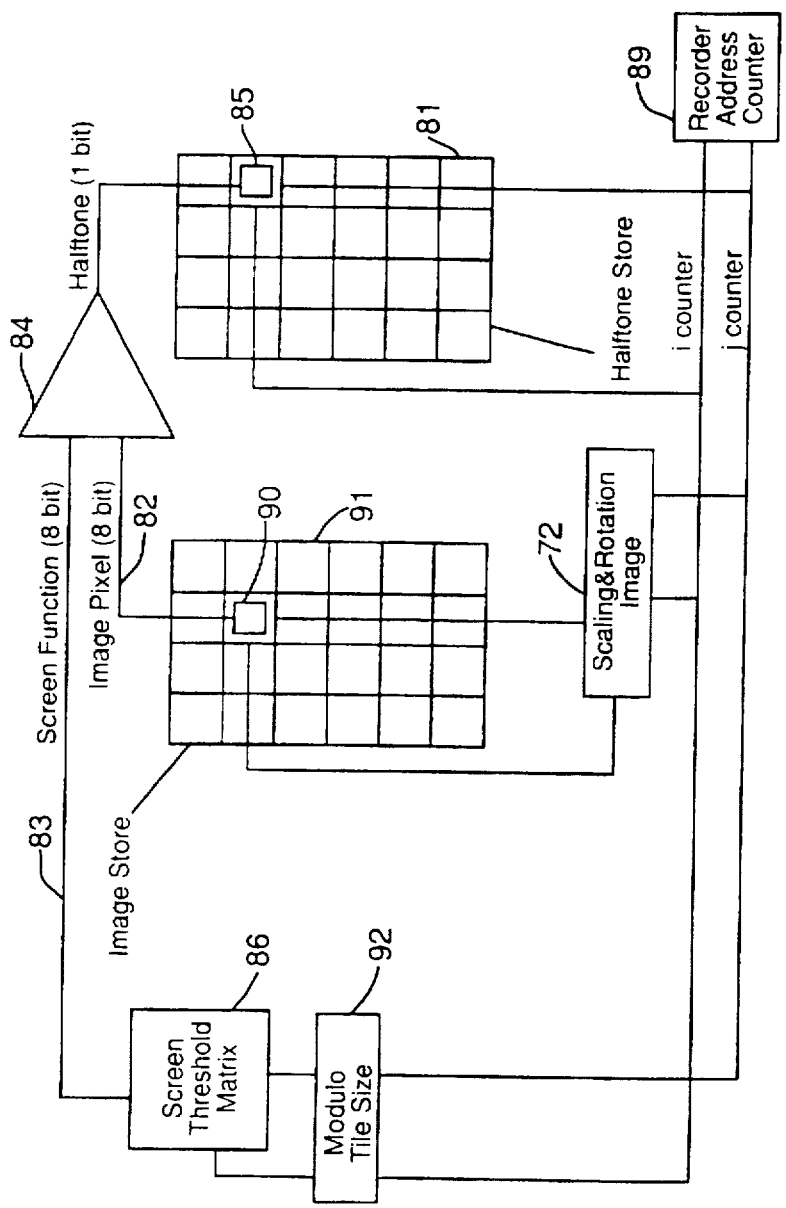

FIG. 8 shows a circuit for generating a halftone image, which may be used in combination with the supercell of FIG. 3 or the threshold matrix of FIG. 7.

While the present invention will hereinafter be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appending claims.

Referring to FIG. 3, the method according to the current invention may be used to generate a rational tangent supercell, such as described in U.S. Pat. No. 5,155,599. As is explained in that patent, such a supercell (21) or "tile" is characterized by a tilesize TS, indicating the linear size of the tile expressed in number of microdots, and two integer values A and B, defining the geometry of the halftone screen.

The angle (α) of the screen is given by the arctangent of A/B. The total number of halftone dots (22) in the supercell (21) is designated by the name "number_of_dots", and is given by the value of $A^2+B^2$.

The total number of microdots contained in a supercell is designated by "number_of_rels" and is equal to TS*TS.

In order to describe the current invention, the values A=1 and B=3 were selected for the example shown in FIG. 3. In this example, the tile has a size of twelve microdots (TS=12) and thus contains number_of_rels=144 microdots. As will be described in conjunction of FIG. 8 below, each microdot within the supercell requires one threshold value in the threshold matrix. As such, also 144 threshold values must be generated. As from the values selected for A and B, the number of halftone dots in the supercell is: number_of_dots=$A^2+B^2$=10.

The centers of the halftone dots (22) are represented by circles in the drawing. FIG. 4 demonstrates how a complete and contiguous halftone screen (23) may be obtained by replicating the rational tangent supercell (21) horizontally and vertically. It will now be explained in detail how the 144 threshold values of the above tile can be calculated in order to apply our invention.

The method preferentially comprises four steps, which may be summarized as follows:

Step 1: calculation of ordering sequence for halftone dots in supercell.

Step 2: assignment of a first set of microdots to each of the halftone dots in the supercell.

Step 3: assignment of a second set of microdots to each of the halftone dots in the supercell.

Step 4: resealing the range of matrix elements to obtain a threshold matrix, suitable for electronic screening.

These steps will now be discussed in more detail below.
Step 1: Ordering sequence for halftone dots A first step consists of assigning an ordering sequence to the number_of_dots halftone dots of the supercell. In order to come to an optimized ordering sequence, the following heuristic algorithm is preferentially used:

The halftone dot that receives the first number of the sequence can be chosen arbitrarily.

The halftone dot that receives the second number is selected so that it is "as far away" as possible form the halftone dot that has received the first sequence number, taking into account the horizontal and vertical replication.

The halftone dot that receives the third ordering number is selected to maximize its distance to the closest of the already selected halftone dots.

If this distance would be the same for two or more "candidate halftone dots", the third ordering number is given to that candidate halftone dot, that maximizes the average distance between all three halftone dots.

The same procedure is preferentially used to select the fourth, fifth, . . . halftone dot, until all the halftone dots in the tile have received an ordering number.

It can be shown that the above algorithm leads to halftone dot distributions that have desirable "blue noise" characteristics.

The above algorithm was used to assign a sequence number, ranging from 0 to 9, to the 10 halftone dots (22) in the supercell (21) of FIG. 3.
Step 2: Assignment of first set microdots to halftone dots This is preferentially done by means of three nested loops.

Before the outer loop is started, a variable, indicated by "relcounter", is initialized to 0. The outer loop controls the order according to which every halftone dot is "visited".

Before the middle loop is started, a variable, indicated by "sizecounter", is initialized to 1. The middle loop keeps track of the size of the halftone dot that is "being visited".

In the inner loop, a spotfunction, identified by "S(dot,rel)", is evaluated for each microdot, belonging to the tile, which has not been assigned yet to a halftone dot. An example of such a spotfunction is:

$$S(dot,rel)=(X_{dot}-X_{rel})^2+(Y_{dot}-Y_{rel})^2$$

($X_{dot}$,$Y_{dot}$) represents the position coordinates of the center of the halftone dot or shortly "halftone dot center";

($X_{rel}$,$Y_{rel}$) represents the position coordinates of a candidate microdot, also referred to as "microdot center" or, in conjunction with a threshold matrix: "center of threshold matrix element";

the spotfunction itself S(dot,rel) corresponds to the square of the Euclidean distance between the halftone dot center ($X_{dot}$,$Y_{dot}$) and the position of candidate microdot ($X_{rel}$,$Y_{rel}$)

At the end of the inner loop, that one microdot is retained, that yields the lowest value for the spotfunction, and the value of the variable "relcounter" is assigned to it, after which the variables "relcounter" and "sizecounter" are incremented by one.

The microdot that has received the value is now being marked as "assigned" to a halftone dot.

By adding a small random value to the position coordinates ($X_{dot}$,$Y_{dot}$) of the halftone dot center, the possibility that two candidate microdots would yield the same spotfunction value can be virtually eliminated.

If the incremented value of the variable "sizecounter" exceeds a certain preset value "maxsizecounter", the algorithm proceeds by returning to the beginning of the outer loop, at which point the next halftone dot is "visited". Otherwise does it proceed by returning to the beginning of the middle loop, at which point the search for a next microdot for the same halftone dot or within the halftone dot environment is started.

When the outer loop is left, the following equation holds
relcounter=number_of_dots * maxsizecounter+1

The above algorithm is summarized by means of the following pseudo-code:

```
relcounter = 0;
for (all the halftone dots in the supercell,
     in order of their assigned sequence)    {
     sizecounter = 1;
     do until (sizecounter = maxsizecounter)    {
          for (all microdots in supercell that have not been
               assigned yet to a halftone dot)    {
               evaluate spotfunction of microdot in
               combination with halftone dot
          }
          assign the value relcounter to the microdot
          that yields the lowest spotfunction value
          sizecounter = sizecounter + 1
          relcounter = relcounter + 1
     }
}
```

FIG. 5 and FIG. 6 show examples where the algorithm was applied for a value of "maxsizecounter" equal to 1 and 4 respectively. In FIG. 5 a threshold matrix is generated for a supercell as represented in FIG. 3, with "maxsizecounter"=

1. In FIG. 6, a threshold matrix according to the present invention is shown, for the supercell represented in FIG. 3, with "maxsizecounter"=4.

Step 3: Assignment of second set microdots to halftone dots

In this third step, the remaining microdots are assigned to each of the halftone dots in the supercell. This is preferentially done by visiting the halftone dots in order of their sequence number and looking for the microdot that yields the lowest spotfunction value. The value of "relcounter" is then assigned to that microdot, after which this value is incremented by one. This process is repeated until no microdots are left over. This condition is fulfilled when the value of "relcounter" is equal to "number_of_rels". At that point, the heuristic search is stopped. The following pseudo-code summarizes the algorithm:

```
do until (relcounter = number_of_rels) {
    for (all the halftone dots in the supercell,
         in order of their assigned sequence) {
        for (all microdots in supercell that have not been
             assigned yet to a halftone dot) {
            evaluate spotfunction of microdot in
            combination with halftone dot
        }
        assign the value relcounter to the microdot
        that yields the lowest spotfunction value
        relcounter = relcounter + 1
    }
}
```

The above algorithm was used to give the other values required in the matrices according to FIG. 5 and FIG. 6.

For large supercells, it is desirable to optimize the speed of the algorithm. This is preferentially done by limiting the search, in the inner loops of the second and third step, for the microdot yielding the lowest spotfunction value, to the microdots that are adjacent to the microdots that were previously assigned to the same halftone dot that is being visited. Another speed improvement may be realised by precalculating and storing in a look up table all the spotfunction values of all the microdots in combination with all the halftone dots. The evaluation of the spotfunction in that case is replaced by a table look up, which is significantly faster than the evaluation itself, especially when a spotfunction is used that involves heavy floating point arithmetic.

Step 4: Rescaling the range of matrix elements

At the end of step 3, a square matrix with TS*TS elements is obtained. According to the above algorithm, such a matrix contains values ranging from 0 to number_of_rels−1. Before this matrix is used as a screening threshold matrix, its elements are preferentially rescaled to match the range of input image pixels to be screened electronically. For a system with 8 bits, the range of the input image pixels is from 0 to 255. Therefore the range of threshold values is preferentially expanded to the range [1,255]. This may be done by:

multiplying every element by a constant factor equal to 254/143;

adding 1 to the result; and, rounding the result to the closest integer number. This leads to the matrix shown in FIG. 7. As can be seen, this threshold matrix represents a screen (photomechanical or electronic threshold matrix), suited for the transformation of a continuous tone image into a halftone image (as will be discussed in conjunction with FIG. 8), wherein said screen comprises a plurality of discrete spotlike zones (each showing four bold adjacent threshold values in FIG. 7 ; for the values 1,3,5,6 the threshold matrix must be tiled as in FIG. 4), arranged on grid points of a periodic grid (compare FIG. 7 with FIG. 3), defined by a screen angle ($\alpha$) and a screen ruling (1/A), each spotlike zone having a plurality of different optical densities (e.g. threshold values 1,3,5,6 ; 8,10,12,13 etc., which are equivalent to optical densities of a photomechanical screen) within a narrow density range (e.g. [1,6 ]; [8,13] etc.), said density range being disjunctive with a density range of at least two closest other spotlike zones. A spotlike zone closest to 8,10,12,13 is 22,24,26,28 and $[8,13] \cap [22,28] = \phi$. In a more preferred embodiment, any region around such a spotlike zone (non-bold threshold values in FIG. 7) has a plurality of optical densities (or threshold values) within a wide density range, said density range having a large overlapping portion with any density range of such other regions. E.g. the region around 37,38,40,42 has threshold values 237, 148, 145, 216, 81, 99, 175, 116, 191, 244, 131, 202, all within a range of [81,237], whereas the region around 58,60,61,63 has threshold values 232, 86, 138, 173, 104, 241, 188, 136, 189, 243, 122, 161, all within [86,243]. The overlapping portion is: $[81,237] \cap [86,243] = [86,237]$, which is a large overlapping portion. The threshold matrix according to FIG. 7 may be used in a device according to FIG. 8 for converting a continuous tone image into a halftone image, by combining the threshold values with the contone pixel values of the continuous tone image, and mark a microdot on a film or printing plate as a result of the combination or comparison. A halftone image on film or on a printing plate may also produced in the classical photomechanical way, by using this above described screen.

Alternatively, a non-proportional scaling of the original matrix values may be done in order to obtain the final threshold matrix suitable for screening. Such a non-proportional scaling, built-in into the threshold matrix, is extremely useful to achieve a non-linear relationship between the pixel values of the unscreened input image and the halftone dot sizes of the output image, into which these values are translated during the screening operation.

At this point, the threshold matrix may be used in combination with a circuit as shown in FIG. 8. This halftone image generator is based on comparing at every position of the recorder grid the pixel value with a screen threshold value. Depending on the outcome, the recorder element is turned "on" or "off". More in detail, the apparatus according to FIG. 8 operates in the following way. A recorder address counter (89) generates all possible combinations or addresses (i,j) to cover the area occupied by the halftone image (81) which may be stored partly or wholly within a halftone store. A contone image (91) may be stored in an image store, but with an orientation and scale different from the required scale and orientation of the halftone image (81) at the recorder grid. Therefore, the i-counter and j-counter from the recorder address counter (89) need to undergo a scaling and rotation transformation in a scaling and rotation unit (72). The input of this unit (72) are the i-counter and j-counter values, the output is an address (x,y) that addresses a contone pixel (90) within the contone image (91), having a contone pixel value (82), which is usually an eight bit value ranging from 0 to 255. In another embodiment, the contone image (91) may be brought at the correct orientation and scale before the screening effectively starts, such that the scaling and rotation unit (72) is superfluous, and each contone pixel (90) is addressed directly by the (i,j) address. The contone pixel value (82) is fed into the comparator (84).

At the same time, the address (i,j) is fed into the "modulo tile size unit" (92). Because in a preferred embodiment the threshold matrix (86) is periodical in a horizontal and vertical dimension, only one template of the complete screening function or the threshold matrix (equivalent to a photomechanical screen) must be stored, preferentially as a pre-rotated supertile, comprising several halftone dots, and the (i,j) coordinates can be reduced to [0 .. TS) by a modulo operation on i and j, shown in (92). TS is the tile size, giving the width and height of the threshold matrix (86), which is square in a preferred embodiment. The resulting i'=mod(i, TS) and j'=mod(j,TS) values address in the threshold matrix (86) a threshold value (83), to be compared with the contone pixel value (82), within the comparator (84). As a result of this comparison, the recorder element or microdot (85) is turned "on" 40 or "off". More information on the operation of the circuit described in FIG. 8 may be found in U.S. Pat. No. 5,155,599. Signals according to the "on" or "off" state of the microdot (85) may now optionally be temporarily stored and then sent to drive an exposing light beam of an image setter, such as the SelectSet Avantra 25 image setter. SelectSet and Avantra are trade names of Miles Inc, Agfa Division in Massachusetts. The light beam may expose a graphical film of the type SFP812p, marketed by Agfa-Gevaert N. V. in Mortsel, Belgium. After exposure by a light beam modulated according to the halftone image, the film is developed and dried. This film is exposed in contact with a photosensitive lithographic printing plate precursor, also called imaging element. The imaging element is generally developed thereafter so that a differentiation results in ink accepting properties between the exposed and unexposed areas.

A particular suitable printing plate precursor or imaging element is a so called mono-sheet DTR material. In one embodiment the mono-sheet DTR material comprises on a flexible support in the order given a silver halide emulsion layer and an image receiving layer containing physical development nuclei e.g. a heavy metal sulphide as e.g. PdS. The image receiving layer is preferably free of binder or contains a hydrophilic binder in amount of not more than 80% by weight. Subsequent to image-wise exposure, the monosheet DTR material is developed using an alkaline processing liquid in the presence of developing agents e.g. of the hydroquinone type and/or pyrazolidone type and a silver halide solvent such as e.g. a thiocyanate. Subsequently the plate surface is neutralized with a neutralizing liquid. Details about the constitution of this type of mono-sheet DTR material and suitable processing liquids can be found in e.g. EP-A-474922, EP-A-423399, U.S. Pat. No. 4,501,811 and U.S. Pat. No. 4,784,933. Lithographic printing plate precursors of this type are marketed by Agfa-Gevaert N. V. under the name of SUPERMASTER and SETPRINT.

In a second embodiment the mono-sheet DTR material comprises on a hydrophilic surface of a support in the order given an image receiving layer containing physical development nuclei e.g. a heavy metal sulphide as e.g. PdS and a silver halide emulsion layer. The image receiving layer is preferably free of binder or contains a hydrophilic binder in amount of not more than 80% by weight. Subsequent to image-wise exposure the mono-sheet DTR material is developed using an alkaline processing liquid in the presence of developing agents e.g. of the hydroquinone type and/or pyrazolidone type and a silver halide solvent such as e.g. a thiosulphate. Subsequently the imaging element is treated to remove the layer(s) on top of said image receiving layer preferably by rinsing with water, thereby uncovering said silver image formed in said image receiving layer. Details about the constitution of this type of mono-sheet DTR material and suitable processing liquids can be found in e.g. U.S. Pat. No. 5,068,165 and U.S. Pat. No. 5,273,858. Lithographic printing plate precursors of this type are marketed by Agfa-Gevaert N. V. under the name of LITHOSTAR LAP-B.

These type of printing plate precursors can be exposed not only as described above in contact with a processed graphical film but due to the high sensitivity of said silver halide emulsion comprising imaging element also directly by the exposing light beam of an image setter.

EXAMPLE

A comparison was made between a classic autotypical screening technique, called Agfa Balanced Screening (ABS), as described in U.S. Pat. No. 5,155,599 and three versions of a screening technique according to the current invention, using the same screening parameters. The screen ruling was chosen 148 lpi and the screen angle 15°, and the shape of the halftone dots was round. According to the first version (V1), halftone dot percentages of 4% and lower were achieved by reducing the number of halftone dots, rather than their size. This meant that the fixed dot area corresponds with a dot size of 38 µm. According to the second version (V2), the transition dot percentage was chosen 5%, corresponding to a 42 µm halftone dot size. For the third version (V3), the transition percentage was chosen 6%. These three versions avoid the appearance of dots smaller than 38 µm, 42 µm or 47 µm, which may not print at all or miss printing endurance.

ABS, V1, V2 and V3 type screened images of a continuous grey wedge and of constant grey patches were recorded on SFP812p film on an image setter SelectSet Avantra 25, working at a recorder pitch of 2400 microdots per inch, with exposure setting of 190. After exposure to the halftone image, the latent image on the film was developed. This film was then used in a Theimer contact frame, to expose a Lithostar LAP-B printing plate precursor. After exposure, the plate was developed in a fresh L5000 developing bath. A second plate, exposed in the same conditions, was developed in the same L5000 bath, which was however conditioned to steady-state use conditions, by developing 5 m² plate material per litre of developing bath.

The printing plate thus obtained was printed on a Heidelberg GT052 press with Hartmann S6920 ink and Rotaprint Rotamatic fountain solution (1 part fountain solution additive+1 part water). The paper used was KNP Royal Impression Brilliant gloss paper, 115 g/m². From the prints it was clear that V1, V2 and V3 according to the current invention give better results in areas with small per cent dot area than the print according to the ABS technique. By visual inspection it was established that the smallest per cent dot area that can be reproduced by ABS in optimal development conditions is 3%. V1, V2 and V3 allow reproduction of 0.5 per cent dot area. If the developing agent was not fresh, ABS reproduced consistently only from 3.5% and higher on. This test may thus also be used to establish the fixed dot area, below which the number of halftone dots is varied rather than their size.

A second test was done to assess the improvement of printing endurance. The same exposure and development conditions (steady-state developing bath) of the printing plate were followed as in the test above, but other printing conditions were used. A SAKURAI Oliver 52 press, with BASF K+E 171 ink and a fountain solution comprising 3% Aqua-ayde and 4% Tame, both from Anchor. Uncoated paper, 80 g/m² was used. The printing endurance according to V1 was substantially better than that according to ABS. V2 was even better than V1. V3 was optimal with respect to long term printing endurance in these printing conditions. After printing 100 sheets, ABS points with 2.5% were hardly visible, whereas after 10,000 sheets they disappeared below 3.5% and after 25,000 sheets they disappeared below 4%. According to V1, 0.5% remained visible up to 10,000 sheets. At 25,000 sheets, visibility disappeared below 4%. According to V2, 0.5% remained visible up to 25,000 sheets. According to V3, no quality was lost, i.e. no density was lost in the highlights, up to 25,000 sheets.

The invention can also be applied for rendering devices, capable of reproducing more than two tone values, such as in a xerographic printing process.

The invention can also be used in color printing applications, where a different halftone screen is used for each color separation. A specific example of such a technology is described in U.S. Pat. No. 5,155,599.

The frequency modulation halftoning technique on an autotypical grid may also be successfully applied to "halftone dot holes" within regions corresponding with a high density. Whenever a specific density is reached, e.g. 95% dot point, it is possible that some "holes" tend to fill up. Once a dot percentage is reached that this may cause problems to consistently reproduce images, the area of the holes may be kept constant and the number of holes may be decreased whenever the density must be increased.

Summary of terms (in alphabetical order):

maxsizecounter: a constant value, indicating the size of the halftone dot, in number of microdots, at which the heuristic algorithm stops assigning subsequent microdots to a single halftone dot, and starts assigning subsequent microdots to different halftone dots.

number_of_dots: total number of halftone dots in a supercell. In a supercell of the type described in FIG. 3, this value is equal to $A^2+B^2$.

number_of_rels: total number of microdots in a supercell. In a supercell of the type described in FIG. 3, this value is equal to TS*TS relcounter: counts the total number of microdots in the supercell, already assigned to any halftone dot, during the heuristic search.

sizecounter: a variable used in the heuristic algorithms to count the number of microdots assigned to one specific halftone dot.

tilesize (TS): the linear size of a supercell, expressed in number of microdots.

Having described in detail preferred embodiments of the current invention, it will now be apparent to those skilled in the art that numerous modifications can be made therein without departing from the scope of the invention as defined in the following claims.

We claim:

1. A printing plate, for reproducing an image, comprising a surface having an image-wise distribution of ink accepting halftone dots on a non-ink accepting background, said halftone dots rendering different optical densities in a reproduction of said image and being arranged on grid points of a periodic grid being defined by a screen angle and a screen ruling, is herein characterized that:

within a first region on said printing plate, corresponding to a region with low optical density on said reproduction:
the number of halftone dots is in accordance with said low density; and, the majority of halftone dots each have a halftone dot area substantially equal to a fixed halftone dot area; and, within a second region on said printing plate, corresponding to a region with high optical density on said reproduction, the halftone dot area of each of said halftone dots is in accordance with said high density.

2. Printing plate according to claim 1, wherein said printing plate comprises on a surface an image-wise distribution of silver containing halftone dots on a hydrophilic background.

3. Printing plate, according to claim 1, wherein:
substantially every grid point, within said second region, is occupied by one halftone dot; and,
the area of substantially each halftone dot, within said second region, is not smaller than said fixed dot area.

4. Printing plate, according to claim 1, wherein the average distance between halftone dots, within said first region, is maximized.

5. Printing plate, according to claim 1, wherein said low density is lower than a transition density, and said high density is higher than said transition density and wherein said transition density is the density of a region on said reproduction, having on each grid point one halftone dot having said fixed dot area.

6. Printing plate, according to claim 1, wherein said fixed dot area is selected such that its density can be consistently reproduced.

7. A method for making a reproduction from an original image, by image-wise exposing a photosensitive medium using a screened representation of said original image, comprising the following steps:

defining grid points on a periodic grid having a screen angle and screen ruling;

image-wise exposing a first region on said photosensitive medium, corresponding to a region with low optical density on said reproduction, to generate halftone dots located on said grid points, wherein:
the number of said halftone dots is in accordance with said low density; and,
the majority of said halftone dots each have a halftone dot area substantially equal to a fixed halftone dot area; and, image-wise exposing a second region on said photosensitive medium, corresponding to a region with high optical density on said reproduction, to generate halftone dots located on said grid points, wherein the halftone dot area of each of said halftone dots is in accordance with said high density.

8. Method according to claim 7, wherein said photosensitive medium comprises a lithographic printing plate precursor, comprising on a support a silver halide emulsion layer and a layer containing physical development nuclei.

9. Method according to claim 8, wherein said image-wise exposure is a high-intensity short time scanning exposure.

10. Method according to claim 7, wherein:
substantially on every grid point, within said second region, one halftone dot is generated; and,
the area of substantially each halftone dot, generated within said second region, is not smaller than said fixed dot area.

11. Method according to claim 7, wherein the average distance between halftone dots, generated within said first region, is maximized.

12. Method according to claim 7, wherein said low density is lower than a transition density, and said high density is higher than said transition density and wherein said transition density is the density of a region on said reproduction, having on each grid point one halftone dot having said fixed dot area.

13. Method according to claim 7, wherein said fixed dot area is selected such that its density can be consistently reproduced.

14. A screen, suited for the transformation of a continuous tone image into a halftone image, wherein said screen comprises a plurality of discrete spotlike zones, arranged on grid points of a periodic grid, defined by a screen angle and a screen ruling, each spotlike zone having a plurality of different optical densities within a narrow density range, said density range being disjunctive with a density range of at least two closest other spotlike zones.

15. Screen according to claim 14, wherein any region around such a spotlike zone has a plurality of different optical densities within a wide density range, said density range having a large overlapping portion with any density range of such other regions.

16. A method of converting a continuous tone image into a halftone image, comprising the step of combining the intensity of said continuous tone image with the density of a screen, suited for the transformation of a continuous tone image into a halftone image, wherein said screen comprises a plurality of discrete spotlike zones, arranged on grid points of a periodic grid, defined by a screen angle and a screen ruling, each spotlike zone having a plurality of different optical densities within a narrow density range, said density range being disjunctive with a density range of at least two closest other spotlike zones.

17. A screening system comprising a means for converting continuous tone image information to halftone image information is characterised therein that it comprises a means for generating, retrieving or storing a screen, suited for the transformation of a continuous tone image into a halftone image, wherein said screen comprises a plurality of discrete spotlike zones, arranged on grid points of a periodic grid, defined by a screen angle and a screen ruling, each spotlike zone having a plurality of different optical densities within a narrow density range, said density range being disjunctive with a density range of at least two closest other spotlike zones.

18. A method for reproducing a contone image as a halftone image on a recording medium, using threshold values in threshold matrix elements arranged in a threshold matrix, suitable for periodically tiling a plane, comprising the following steps:

establishing within said threshold matrix a plurality of locations for halftone dot centers, arranged on a periodic grid having a screen angle and screen ruling, each of said halftone dot centers having a halftone dot environment, enclosing just one halftone dot center and comprising a plurality of centers of threshold matrix elements;

splitting up the threshold values in a first range and a second range;

assigning at least two consecutive threshold values belonging to the first range to threshold matrix elements whose centers are both comprised within one and the same halftone dot environment; and, using said threshold matrix in combination with said contone image to generate a screened image on said recording medium.

19. Method according to claim 18, further comprising the step of assigning each two consecutive threshold values, belonging to the second range, to threshold matrix elements whose centers are comprised in two different halftone dot environments.

20. Method according to claim 18, further comprising the step of imposing an ordering sequence on said halftone dot centers for assigning consecutive threshold values.

21. Method according to claim 18, further comprising the step of resealing the range of said threshold values according to a range of pixel values within said contone image.

* * * * *